US00RE45715E

(19) United States
(12) Reissued Patent
Krueger

(10) Patent Number: US RE45,715 E
(45) Date of Reissued Patent: Oct. 6, 2015

(54) NECTAR BOTTLE FOR A BIRD FEEDER

(71) Applicant: Classic Brands, LLC, Denver, CO (US)

(72) Inventor: Bryan Krueger, Denver, CO (US)

(73) Assignee: Classic Brands, LLC, Denver, CO (US)

(21) Appl. No.: 29/486,002

(22) Filed: Mar. 25, 2014

Related U.S. Patent Documents

Reissue of:
(64) Patent No.: Des. 678,628
Issued: Mar. 19, 2013
Appl. No.: 29/416,890
Filed: Mar. 28, 2012

(51) LOC (10) Cl. ..... 30-03
(52) U.S. Cl.
USPC ..... D30/127
(58) Field of Classification Search
USPC ..... D30/121, 124–128, 133; D7/523, 525; D25/129; D9/552; D6/709.18; 119/51.01, 27.8, 57.9, 52.2, 52.4
See application file for complete search history.

(56) References Cited

U.S. PATENT DOCUMENTS

| | | | | | |
|---|---|---|---|---|---|
| 117,807 | A | * | 8/1871 | Orndorff | 119/77 |
| D8,908 | S | | 1/1876 | Wiley | |
| D28,734 | S | | 5/1898 | Muller | |
| 632,167 | A | * | 8/1899 | Biesmeyer | 206/214 |
| 721,435 | A | | 2/1903 | Fielding | |
| 727,597 | A | * | 5/1903 | Day | 119/77 |
| 813,954 | A | * | 2/1906 | Davis | 119/77 |
| 1,010,543 | A | | 12/1911 | Walter et al. | |
| 1,023,240 | A | | 4/1912 | Bowier | |
| D43,781 | S | * | 4/1913 | Sanford | D7/597 |
| 1,091,392 | A | | 3/1914 | Schlichtinger | |
| 1,107,206 | A | | 8/1914 | Schwartzburg | |
| 1,136,092 | A | | 4/1915 | Blumere | |
| 1,181,045 | A | | 4/1916 | Tessier | |
| 1,251,935 | A | * | 1/1918 | Stevens | 119/77 |
| 1,391,353 | A | | 9/1921 | Wells | |
| 1,423,547 | A | | 7/1922 | Strohbach | |
| D62,916 | S | | 8/1923 | Peck | |
| 1,555,407 | A | | 9/1925 | Ferris | |
| 1,566,571 | A | | 12/1925 | Appleton | |
| D71,107 | S | | 9/1926 | Gorowitz | |
| 1,634,569 | A | * | 7/1927 | Bray | 220/298 |
| D76,001 | S | | 8/1928 | Broch | |
| D81,602 | S | * | 7/1930 | Teague | D9/546 |
| D84,104 | S | | 5/1931 | Rithner | |

(Continued)

OTHER PUBLICATIONS

Restriction Requirement, Design U.S. Appl. No. 29/387,517, mailed Oct. 12, 2011, 4 pages.

(Continued)

*Primary Examiner* — Phillip S Hyder
(74) *Attorney, Agent, or Firm* — Polsinelli PC

(57) CLAIM

The ornamental design for a nectar bottle for a bird feeder, as shown and described.

DESCRIPTION

FIG. 1 is a front perspective view of an embodiment of a nectar bottle for a bird feeder embodying my new design.
FIG. 2 is a left side view thereof.
FIG. 3 is a right side view thereof.
FIG. 4 is a top view thereof; and,
FIG. 5 is a bottom view thereof.
*The broken lines depict portions of the nectar bottle for a bird feeder in which the design is embodied that are not considered part of the claimed design.*

1 Claim, 5 Drawing Sheets

Matter enclosed in heavy brackets [ ] appears in the original patent but forms no part of this reissue; matter printed in italics indicates the additions made by reissue.

AMENDED

(56) References Cited

U.S. PATENT DOCUMENTS

D95,019 S 4/1935 Cooperstein
D105,812 S 8/1937 Siekert
D121,675 S 7/1940 Goldin
D126,997 S 5/1941 Bentzen et al.
D130,923 S 12/1941 Philipovich
2,267,883 A 12/1941 Wood
D132,522 S 5/1942 Fuerst et al.
2,350,922 A * 6/1944 Planeta ..... 47/67
D140,392 S 2/1945 Haynes
2,432,632 A 12/1947 Seibel
D149,729 S 5/1948 Aronek
D153,759 S * 5/1949 Blatt ..... D9/689
2,475,207 A 7/1949 Smith
D158,279 S * 4/1950 Heftler-Louiche ..... D9/529
2,570,733 A 10/1951 Thomas
D165,628 S 1/1952 Blazier
2,641,086 A 6/1953 Stephen
D173,658 S * 12/1954 Jones ..... D30/128
2,696,803 A 12/1954 Deffenbaugh
D174,909 S 6/1955 Kllegberg
D175,435 S 8/1955 Moffat
2,725,663 A * 12/1955 Mullen ..... 43/131
D178,917 S * 10/1956 England et al. ..... D9/539
2,891,508 A 6/1959 Bower
2,944,516 A 7/1960 Malloy, Sr.
2,971,671 A * 2/1961 Shakman ..... 220/624
3,022,768 A 2/1962 Lynch
3,050,619 A 8/1962 Abramson
3,051,303 A 8/1962 Daanen
D194,846 S 3/1963 Perry
3,089,605 A 5/1963 Buonauro
D196,777 S 11/1963 Haynes
3,125,069 A 3/1964 Fowler
D200,472 S 3/1965 Chang
3,244,150 A 4/1966 Benton
D205,772 S 9/1966 Blair
3,307,602 A 3/1967 Boster
3,316,884 A 5/1967 Viggars
3,372,676 A 3/1968 Williams
D214,172 S 5/1969 Troutman
D216,361 S * 12/1969 Pappas, Jr. ..... D9/538
3,491,724 A 1/1970 Sunner
D217,470 S 5/1970 Morrow
3,526,335 A * 9/1970 Swett et al. ..... 220/630
3,634,678 A 1/1972 Glass et al.
D230,948 S * 3/1974 Moon ..... D8/378
D234,180 S 1/1975 Dart et al.
D234,615 S 3/1975 Kilham
D236,139 S 7/1975 Kilham
3,901,192 A 8/1975 Adams
3,913,527 A 10/1975 Kilham
3,928,936 A 12/1975 Wollen
D239,182 S 3/1976 Kilham
D241,149 S 8/1976 Miller et al.
D241,860 S * 10/1976 Calamia ..... D30/128
D244,786 S 6/1977 Dryden
4,030,451 A 6/1977 Miller
4,037,361 A 7/1977 Murphy et al.
D245,643 S 8/1977 Orfei
D246,294 S 11/1977 Hetherington
4,082,872 A 4/1978 Hughes
4,085,706 A 4/1978 Evans
D248,006 S 5/1978 Christian
4,144,842 A * 3/1979 Schlising ..... 119/52.3
D252,288 S 7/1979 Kilham
D258,338 S 2/1981 Gersin
D260,184 S * 8/1981 Whatley ..... D25/129
D260,843 S * 9/1981 Laird et al. ..... D7/608
D264,434 S * 5/1982 Pettengill ..... D9/545
D266,611 S * 10/1982 Metts et al. ..... D30/128
4,369,216 A 1/1983 Willinger
D268,056 S * 2/1983 Campbell-Kelly et al. .. D30/121
4,395,015 A 7/1983 Reardon
D271,434 S 11/1983 Love
D272,507 S * 2/1984 Conti ..... D7/615
D272,508 S * 2/1984 Conti ..... D7/615
D273,429 S 4/1984 Kilham
4,444,324 A * 4/1984 Grenell ..... 215/6
D274,563 S 7/1984 Blasbalg
D277,514 S * 2/1985 Bescherer ..... D30/128
D277,703 S 2/1985 Kilham
D277,988 S 3/1985 Kilham
D278,751 S * 5/1985 Seager ..... D28/76
D280,559 S 9/1985 Bentall
D281,768 S 12/1985 Hansen, Jr.
D282,019 S * 12/1985 Kilham ..... D30/127
D284,033 S * 5/1986 Brodsky ..... D24/117
4,588,618 A 5/1986 Wolfe
D285,840 S 9/1986 Poon
D287,652 S 1/1987 Mack
D288,353 S 2/1987 Smith
D289,143 S * 4/1987 Guillaume ..... D9/501
4,664,066 A * 5/1987 Steuernagel et al. ..... 119/52.2
D290,769 S 7/1987 Taylor
D290,773 S * 7/1987 Liethen ..... D30/124
4,691,665 A 9/1987 Hefner
D292,372 S * 10/1987 Sykes ..... D2/203.2
4,708,892 A 11/1987 Young et al.
4,732,112 A * 3/1988 Fenner et al. ..... 119/52.2
4,789,572 A 12/1988 Weaver
4,798,172 A 1/1989 Clarke
D304,536 S 11/1989 Blaser
4,901,673 A * 2/1990 Overstreet ..... 119/77
D309,639 S 7/1990 Knudsen
D309,640 S 7/1990 Knudsen
4,938,168 A * 7/1990 Meidell ..... 119/77
D309,858 S * 8/1990 Meyersburg ..... D23/225
D314,253 S 1/1991 Goetz
4,996,947 A 3/1991 Petrides
D322,044 S 12/1991 Marsar et al.
5,083,881 A 1/1992 Yoshinaga
D326,003 S 5/1992 Embree
5,140,945 A * 8/1992 Barnhart et al. ..... 119/52.2
D329,892 S * 9/1992 Brister ..... D23/228
D331,647 S 12/1992 Embree
D331,864 S 12/1992 Sciubba
5,183,005 A 2/1993 Tyler
5,195,463 A 3/1993 Lorenzana et al.
D334,635 S * 4/1993 Wenstrand ..... D30/128
D337,271 S * 7/1993 Pezzoli et al. ..... D9/503
D338,317 S * 8/1993 Woodward ..... D99/28
5,247,904 A * 9/1993 Anderson ..... 119/72
D343,030 S 1/1994 Harwick, Jr.
D345,444 S 3/1994 Kestekides-Kesdekoglu
D347,172 S * 5/1994 Heynen et al. ..... D9/775
D347,714 S 6/1994 Maple et al.
D360,710 S 7/1995 Colwell
D360,829 S * 8/1995 Leeds ..... D9/773
5,450,816 A 9/1995 Santa Cruz
D365,411 S 12/1995 Yan
D366,413 S * 1/1996 Tober ..... D9/429
5,479,879 A * 1/1996 Biek ..... 119/52.2
D368,337 S 3/1996 Dickinson
D368,989 S 4/1996 Prehart
5,507,249 A 4/1996 Shaw
D371,230 S 6/1996 Nottingham et al.
5,522,758 A 6/1996 Liu
D371,401 S 7/1996 Nielsen et al.
D371,838 S 7/1996 Davis et al.
5,564,226 A 10/1996 Paramest
D376,035 S * 11/1996 Boucheron ..... D28/91.1
D376,731 S * 12/1996 Lin ..... D7/536
D378,312 S 3/1997 Davis, Jr.
D380,066 S 6/1997 Green et al.
5,638,638 A 6/1997 Moskowitz
D382,376 S 8/1997 Bescherer
5,655,477 A * 8/1997 Hoffman et al. ..... 119/52.2
D383,878 S 9/1997 Merino et al.
D386,811 S 11/1997 Milicia
5,682,835 A 11/1997 Walter
D387,156 S 12/1997 Johnson
D388,235 S 12/1997 Wilson et al.
5,701,841 A 12/1997 Fasino
D392,763 S 3/1998 Denison

(56) References Cited

U.S. PATENT DOCUMENTS

D394,468 S 5/1998 Leadbetter
D397,529 S 8/1998 Fuller et al.
5,800,047 A 9/1998 Yang
5,806,460 A 9/1998 Klein
D399,611 S * 10/1998 Ericson et al. ..... D30/124
5,816,686 A 10/1998 Wang et al.
5,823,135 A 10/1998 Gilchrist et al.
5,845,605 A 12/1998 Malamphy
5,848,493 A 12/1998 Gasper
D406,307 S * 3/1999 Kang ..... D22/117
D408,420 S * 4/1999 Buter ..... D15/7
5,899,555 A 5/1999 Lin
D412,226 S 7/1999 Bellehumer
5,947,054 A 9/1999 Liethen
D417,528 S 12/1999 Rizzo
6,012,414 A 1/2000 Klein
D420,284 S * 2/2000 Sagel ..... D9/428
D421,643 S 3/2000 Mauk
D423,722 S * 4/2000 Lang ..... D28/76
D425,259 S * 5/2000 Lang ..... D28/89
6,079,361 A * 6/2000 Bowell et al. ..... 119/72
6,095,087 A 8/2000 Bloedorn
D431,760 S * 10/2000 Sullivan ..... D7/672
D433,633 S * 11/2000 La Fata ..... D9/502
D433,747 S 11/2000 Frampton
D434,980 S * 12/2000 Suzuki ..... D9/418
D438,360 S 2/2001 Robinson
D440,002 S 4/2001 Miranda
D440,677 S 4/2001 Long et al.
6,213,054 B1 4/2001 Marshall
D443,711 S 6/2001 Lindsay
D445,525 S 7/2001 Pan
D445,533 S 7/2001 Arnoldo
D445,939 S 7/2001 Pan
D448,290 S * 9/2001 Schultz et al. ..... D9/503
6,305,321 B1 10/2001 Potente
D450,786 S 11/2001 Jenkins et al.
D451,997 S 12/2001 Schwartz
D454,192 S 3/2002 Frampton
D454,636 S 3/2002 Lantz
D454,669 S 3/2002 Lieb
D459,824 S 7/2002 Leen
D461,827 S * 8/2002 Koebbe ..... D15/7
6,439,158 B1 8/2002 Blohm
6,450,120 B1 9/2002 Nylen
6,499,430 B2 12/2002 Garcia-Lucio et al.
D470,621 S 2/2003 Cheng
D473,739 S 4/2003 Lenger
6,543,384 B2 * 4/2003 Cote ..... 119/57.9
D476,755 S 7/2003 LoVullo et al.
6,591,781 B2 * 7/2003 Hardison ..... 119/57.9
D478,475 S 8/2003 Backes et al.
D479,595 S 9/2003 Curtin
D479,596 S 9/2003 Curtin
D479,597 S 9/2003 Curtin
D480,135 S 9/2003 Frampton
D480,802 S 10/2003 Frampton
D480,803 S 10/2003 Frampton
D482,736 S 11/2003 Manville
D483,529 S 12/2003 Fort, II
D483,858 S 12/2003 Lin
6,659,041 B1 * 12/2003 Curts ..... 119/52.2
D485,208 S 1/2004 Fan
D485,345 S 1/2004 Bucher
D485,350 S 1/2004 Frampton
D485,351 S 1/2004 Frampton
D485,387 S 1/2004 Harbaugh
D485,928 S 1/2004 Leung et al.
6,672,249 B2 1/2004 Garcia-Lucio et al.
D488,195 S 4/2004 Manville
D488,219 S 4/2004 Frampton
D489,128 S 4/2004 Frampton
6,733,151 B2 5/2004 Shu
D490,745 S 6/2004 Fan
D491,019 S 6/2004 Marsden et al.
D491,657 S 6/2004 Cartwright
D492,601 S * 7/2004 Ogata et al. ..... D9/775
D493,053 S * 7/2004 Snell ..... D6/520
6,776,511 B1 8/2004 Lindsay
D495,839 S 9/2004 Muday et al.
D497,406 S * 10/2004 King ..... D23/209
D502,293 S 2/2005 Harger
D502,294 S 2/2005 Hung
6,860,229 B1 3/2005 Craft
6,861,108 B1 3/2005 Potoroka, Sr.
D505,521 S * 5/2005 Schrodt ..... D30/124
6,890,155 B2 5/2005 Cartwright
D506,826 S 6/2005 Frampton
6,945,192 B2 * 9/2005 Cote ..... 119/57.9
D510,992 S 10/2005 Bucher
D514,749 S 2/2006 Fort et al.
D515,916 S * 2/2006 Bleuer ..... D9/428
D516,712 S 3/2006 Pickett
D518,380 S * 4/2006 Moran ..... D9/502
7,032,538 B1 4/2006 Lush
7,040,251 B2 5/2006 Fort, II
D523,141 S * 6/2006 Massey ..... D24/121
D523,955 S 6/2006 Badarello
D524,490 S 7/2006 Obenshain
D525,903 S 8/2006 Weiser et al.
D529,220 S 9/2006 Izardel
D530,457 S 10/2006 Jung et al.
D532,132 S 11/2006 Holsinger et al.
D536,838 S 2/2007 Colvin et al.
D538,485 S 3/2007 Degironne
D540,349 S * 4/2007 Waki et al. ..... D15/9
D541,466 S 4/2007 Bucher et al.
D542,479 S 5/2007 O'Dell
D542,659 S * 5/2007 Meether et al. ..... D9/502
D543,665 S 5/2007 Hewitt et al.
7,234,416 B2 * 6/2007 Hoff ..... 119/57.9
7,234,418 B2 6/2007 Fort et al.
D545,984 S 7/2007 Leung et al.
D546,991 S 7/2007 Poon
D548,321 S 8/2007 Orozco
D548,587 S 8/2007 DuVal et al.
D554,252 S 10/2007 Bucher et al.
D556,568 S 12/2007 DuVal
D559,472 S 1/2008 Abinanti et al.
D561,021 S 2/2008 DuVal et al.
D561,040 S * 2/2008 Sequeira ..... D9/548
D563,608 S 3/2008 Kitchen
D563,616 S 3/2008 Lynde et al.
D565,173 S 3/2008 Bucher et al.
D567,098 S * 4/2008 Sequeira ..... D9/552
D568,754 S * 5/2008 Sequeira ..... D9/560
D569,301 S 5/2008 Fotherby
7,396,212 B1 7/2008 Parker et al.
D575,118 S * 8/2008 Bignon ..... D7/672
D575,591 S * 8/2008 Bonetti ..... D7/615
D575,864 S 8/2008 Parker et al.
7,448,346 B1 * 11/2008 Stone et al. ..... 119/52.3
7,448,347 B2 11/2008 Richmond
D584,387 S 1/2009 Lee et al.
D585,625 S 1/2009 Gray
D588,756 S 3/2009 Colvin et al.
7,506,611 B1 3/2009 Lush
D591,589 S * 5/2009 Myers et al. ..... D9/418
D592,046 S * 5/2009 Myers et al. ..... D9/418
D593,649 S 6/2009 Marvell
D595,525 S 7/2009 Dimond
D596,033 S * 7/2009 Zach et al. ..... D9/517
D597,197 S 7/2009 Parker et al.
D599,159 S * 9/2009 Stein ..... D7/306
D600,861 S 9/2009 Sin
D601,309 S 9/2009 Babal
7,600,487 B2 10/2009 Stone et al.
D604,436 S 11/2009 Poon
D606,447 S * 12/2009 West et al. ..... D11/80
D606,708 S 12/2009 McMullen
D606,709 S 12/2009 McMullen
D606,878 S 12/2009 Lindfors
D609,329 S 2/2010 Parker et al.
D612,549 S 3/2010 Garcia-Lucio et al.

(56) References Cited

U.S. PATENT DOCUMENTS

| | | | | |
|---|---|---|---|---|
| 7,685,969 | B2 | 3/2010 | Stone et al. | |
| D614,825 | S | 4/2010 | Biegel | |
| D615,310 | S | 5/2010 | Cybulski | |
| 7,743,732 | B2 * | 6/2010 | Webber | 119/77 |
| D620,172 | S | 7/2010 | Orozco | |
| D623,806 | S | 9/2010 | Modi et al. | |
| 7,789,040 | B2 | 9/2010 | Liethen | |
| D627,457 | S | 11/2010 | Klausing et al. | |
| D629,137 | S | 12/2010 | Chen | |
| D630,969 | S | 1/2011 | Mattis | |
| 7,861,671 | B2 | 1/2011 | Carter et al. | |
| 7,874,264 | B2 * | 1/2011 | McMullen | 119/52.2 |
| D633,659 | S | 3/2011 | Lai | |
| D636,238 | S * | 4/2011 | Elmelund | D8/14.1 |
| D636,539 | S | 4/2011 | Montoya | |
| D636,946 | S | 4/2011 | Able | |
| 7,946,249 | B2 | 5/2011 | Colvin et al. | |
| 7,958,845 | B2 * | 6/2011 | Gardner | 119/77 |
| D641,516 | S | 7/2011 | Chen | |
| D643,442 | S * | 8/2011 | Sato et al. | D15/9 |
| D643,855 | S * | 8/2011 | Taniguchi et al. | D15/7 |
| 7,997,434 | B2 * | 8/2011 | Benetti | 215/376 |
| 8,011,323 | B2 | 9/2011 | Vaughn et al. | |
| 8,051,803 | B2 | 11/2011 | Gauker et al. | |
| D650,514 | S | 12/2011 | Lin et al. | |
| D652,059 | S * | 1/2012 | Sato et al. | D15/9 |
| D652,972 | S | 1/2012 | Lee | |
| D653,011 | S | 1/2012 | Myers | |
| D656,279 | S | 3/2012 | Tu | |
| D656,690 | S * | 3/2012 | Tu | D30/127 |
| D657,399 | S * | 4/2012 | Nemoto | D15/28 |
| D658,684 | S * | 5/2012 | Roman | D15/9 |
| D661,434 | S | 6/2012 | Fields et al. | |
| D664,437 | S * | 7/2012 | Barel | D9/538 |
| 8,230,809 | B2 * | 7/2012 | Cote | 119/52.3 |
| 8,276,541 | B2 * | 10/2012 | LoRocco et al. | 119/72 |
| 2003/0226514 | A1 | 12/2003 | Cote | |
| 2004/0010971 | A1 | 1/2004 | Redfield et al. | |
| 2004/0118354 | A1 | 6/2004 | Cox et al. | |
| 2004/0134437 | A1 | 7/2004 | Fort | |
| 2004/0261726 | A1 | 12/2004 | Lumpkin | |
| 2005/0127074 | A1 | 6/2005 | Kusuma et al. | |
| 2006/0005774 | A1 | 1/2006 | Newman Bornhofen | |
| 2006/0065202 | A1 | 3/2006 | Fort et al. | |
| 2006/0090707 | A1 | 5/2006 | Donegan | |
| 2008/0022936 | A1 | 1/2008 | Stone et al. | |
| 2008/0035068 | A1 | 2/2008 | Gou | |
| 2008/0257273 | A1 | 10/2008 | Carter et al. | |
| 2009/0078211 | A1 | 3/2009 | Charlton | |
| 2009/0145875 | A1 | 6/2009 | Gardner | |
| 2009/0308321 | A1 | 12/2009 | Szczygiel-Durante | |
| 2009/0320765 | A1 | 12/2009 | Gauker et al. | |
| 2010/0024738 | A1 | 2/2010 | Chen et al. | |
| 2010/0224132 | A1 | 9/2010 | Gauker et al. | |
| 2011/0011345 | A1 | 1/2011 | LoRocco et al. | |
| 2011/0067637 | A1 | 3/2011 | Baynard | |
| 2011/0180004 | A1 | 7/2011 | Humphries et al. | |
| 2011/0297095 | A1 | 12/2011 | Cruz et al. | |
| 2012/0055410 | A1 | 3/2012 | Cote | |

OTHER PUBLICATIONS

Response to Restriction, Design U.S. Appl. No. 29/387,517, filed Dec. 12, 2011, 2 pages.
Notice of Allowance, Design U.S. Appl. No. 29/382,075, mailed Feb. 1, 2012, 18 pages.
Non-Final Office Action, Design U.S. Appl. No. 29/387,517, mailed Mar. 12, 2012, 7 pages.
Ex Parte Quayle Action, Design U.S. Appl. No. 29/382,076, mailed Mar. 23, 2012, 13 pages.
Response to Ex Parte Quayle Action, Design U.S. Appl. No. 29/382,076, filed May 23, 2012, 9 pages.
Response to Non-Final Office Action, Design U.S. Appl. No. 29/387,517, filed Jun. 12, 2012, 13 pages.
Notice of Allowance, Design U.S. Appl. No. 29/387,517, mailed Jul. 3, 2012, 11 pages.
Ex Parte Quayle Action, Design U.S. Appl. No. 29/416,885, mailed Aug. 2, 2012, 11 pages.
Duncraft, Inc., Four Flower Frolic Feeder Set, (date unknown) located at http://www.duncraft.com/Four-Flower-Frolic-Humming-bird-Feeder-Set, 2 pages, offered for sale no later than Mar. 27, 2012.
Restriction Requirement, U.S. Appl. No. 29/387,517, mailed Oct. 12, 2011, 4 pages.
Response to Restriction, U.S. Appl. No. 29/387,517, filed Dec. 12, 2011, 2 pages.
Notice of Allowance, U.S. Appl. No. 29/382,075, mailed Feb. 1, 2012, 18 pages.
Non-Final Office Action, U.S. Appl. No. 29/387,517, mailed Mar. 12, 2012, 7 pages.
Ex Parte Quayle Action, U.S. Appl. No. 29/382,976, mailed Mar. 23, 2012, 13 pages.
Response to Ex Parte Quayle Action, U.S. Appl. No. 29/382,076, filed May 23, 2012, 9 pages.
Response to Non-Final Office Action, U.S. Appl. No. 29/387,517, filed Jun. 12, 2012, 13 pages.
Non-Final Office Action, U.S. Appl. No. 13/107,841, mailed Jun. 27, 2012, 9 pages.
Notice of Allowance, U.S. Appl. No. 29/387,517, mailed Jul. 3, 2012, 11 pages.
Ex Parte Quayle Action, U.S. Appl. No. 29/416/885, mailed Aug. 2, 2012, 11 pages.
Duncraft, Inc., JB's Hummingbird Feeder, (date unknown) located at http://www.duncraft.com/JBS-Hummingbird-Feeder, 3 pages, offered for sale no later than Mar. 27, 2012.
Duncraft, Inc., Jewel Hummingbird Feeder, (date unknown) located at http://www.duncraft.com/Jewel-Cut-Hummingbird-Feeder, 2 pages, offered for sale no later than Mar. 27, 2012.
Duncraft, Inc., Lantern Hummingbird Feeder, (date unknown) located at http://www.duncraft.com/index/page/product/product_id/1326/product_name/Lantern+Hummingbird+Feeder, 2 pages, offered for sale no later than Mar. 27, 2012.
Duncraft, Inc., Deluxe Hummer Feeder, (date unknown) located at http://www.duncraft.com/index/page/product/product_id/1020/product_name/Deluxe+Hummer+Feeder, 2 pages, offered for sale no later than Mar. 27, 2012.
Duncraft, Inc., Four Flower Frolic Feeder Set, (date unknown) located at http://wvvw.duncraft.com/Four-Flower-Frolic-Humming-bird-Feeder-Set, 2 pages, offered for sale no later than Mar. 27, 2012.
Duncraft, Inc., Hollyhock Hummingbird Feeder, (date unknown) located at http://www.duncraft.com/Hollyhock-Hummingbird-Feeder, 2 pages, offered for sale no later than Mar. 27, 2012.
U.S. Appl. No. 29/382,076, filed Dec. 29, 2010, Fields et al.
U.S. Appl. No. 29/382,075, filed Dec. 29, 2010, Fields et al.
U.S. Appl. No. 29/387,517, filed Mar. 14, 2011, Krueger.
U.S. Appl. No. 29/387,518, filed Mar. 14, 2011, Krueger et al.
U.S. Appl. No. 13/107,841, filed May 13, 2011, Donegan et al.
U.S. Appl. No. 13/420,063, filed Mar. 14, 2012, Carter et al.
U.S. Appl. No. 13/420,086, filed Mar. 14, 2012, Carter et al.
U.S. Appl. No. 29/416,885, filed Mar. 28, 2012, Krueger.

* cited by examiner

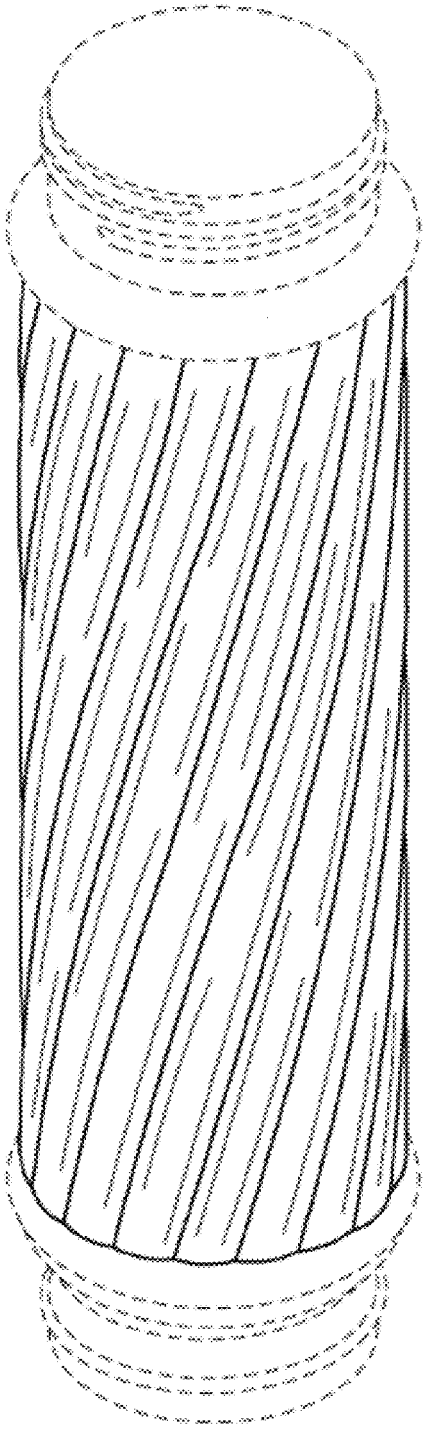
FIG. 1
AMENDED

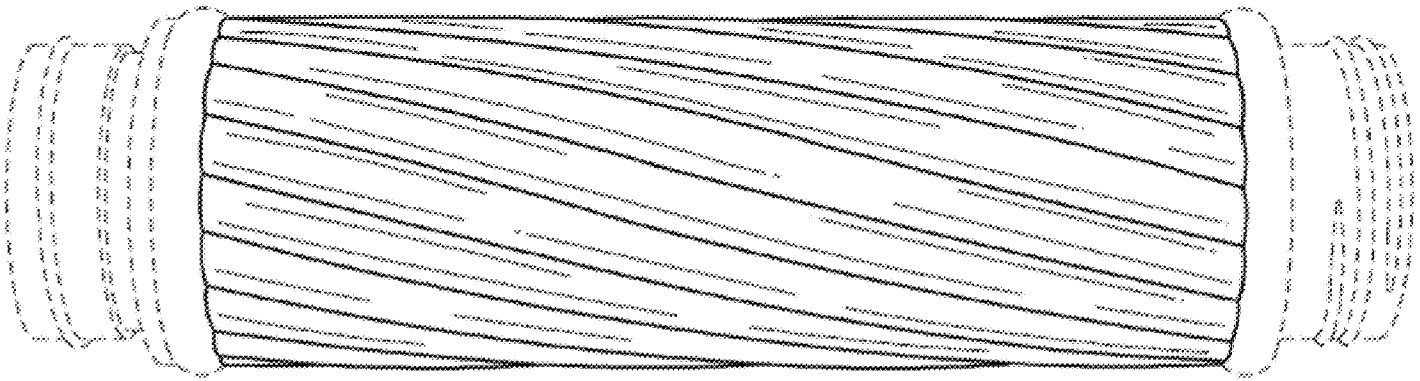
FIG. 2
AMENDED

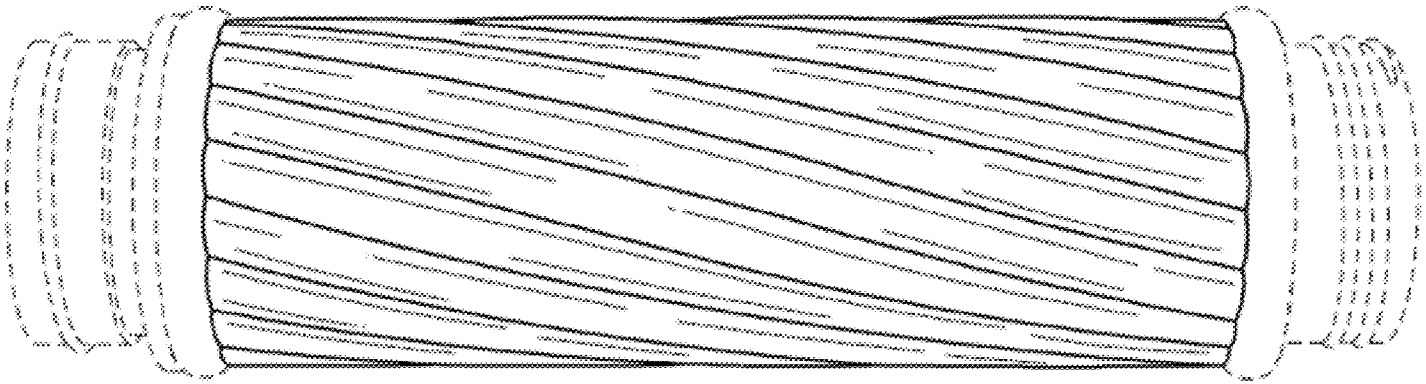
FIG. 3
AMENDED

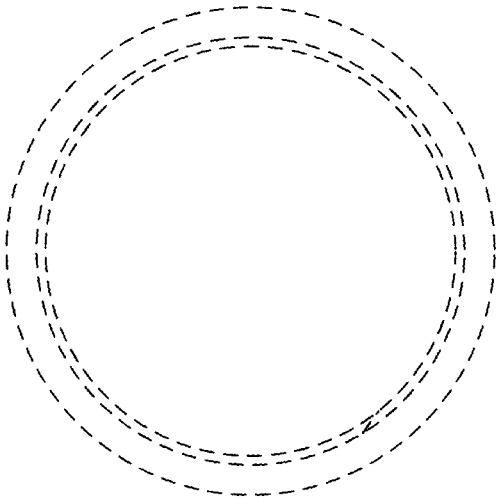
FIG. 4
AMENDED

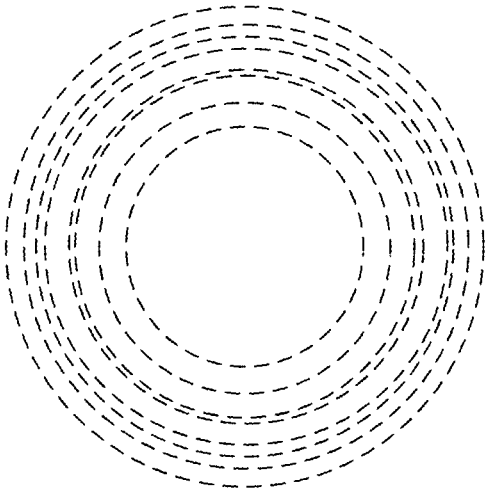
FIG. 5
AMENDED